Dec. 20, 1949  S. J. MIKINA  2,491,998
FLUID FLOW INDICATOR
Filed Feb. 19, 1944  2 Sheets-Sheet 1

WITNESSES:
Wm. B. Sellers
Earnest L. Obukeim

INVENTOR
Stanley J. Mikina.
BY
Paul E. Friedemann
ATTORNEY

Dec. 20, 1949 S. J. MIKINA 2,491,998
FLUID FLOW INDICATOR
Filed Feb. 19, 1944 2 Sheets-Sheet 2
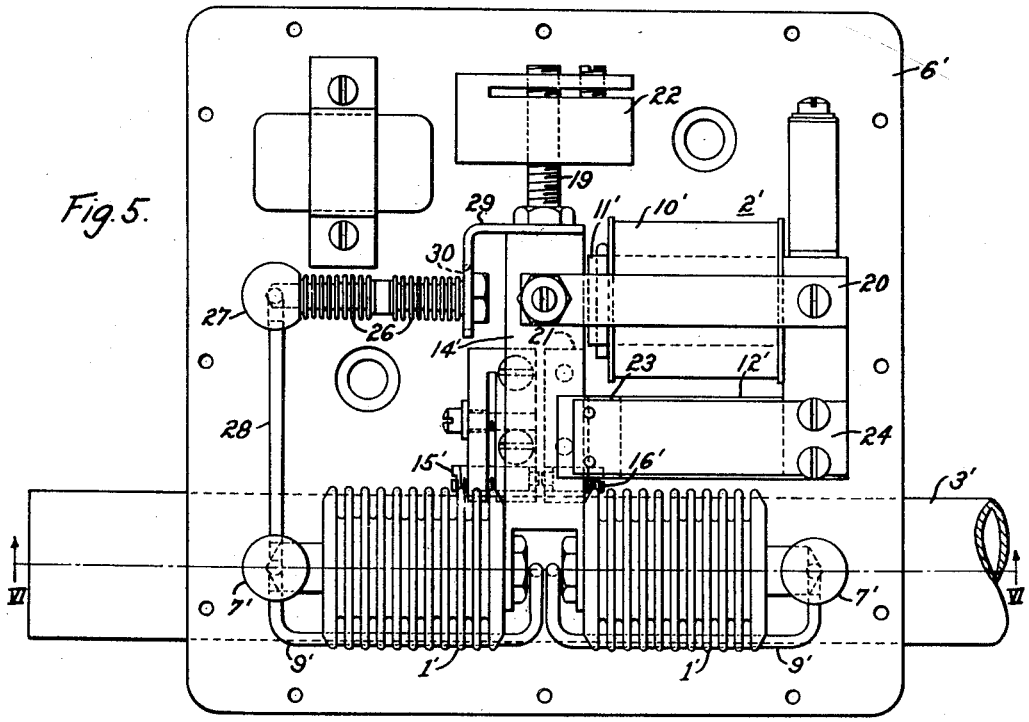
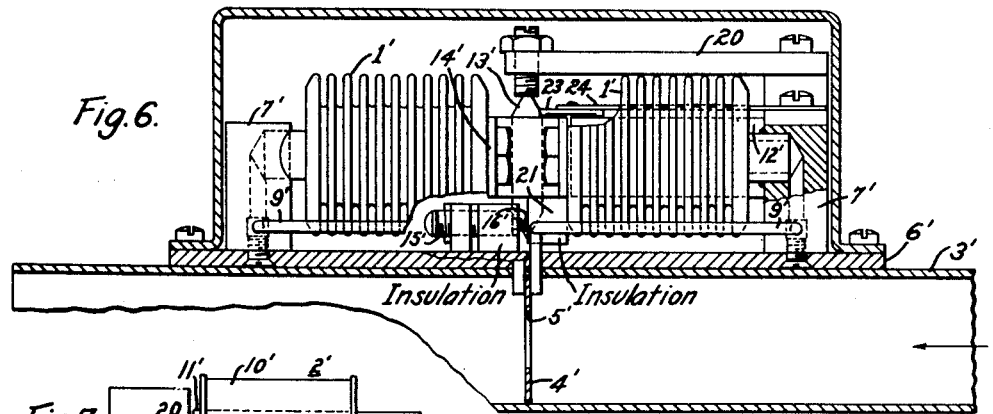
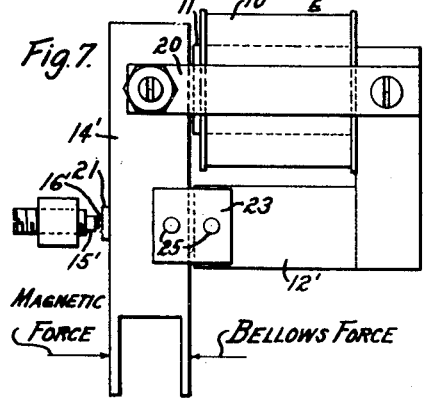
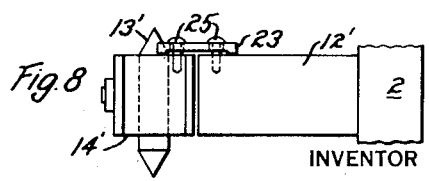
INVENTOR
Stanley J. Mikina.
BY
Paul E. Friedemann
ATTORNEY

Patented Dec. 20, 1949

2,491,998

UNITED STATES PATENT OFFICE 2,491,998

FLUID-FLOW INDICATOR

Stanley J. Mikina, Wilkinsburg, Pa., assignor to Westinghouse Electric Corporation, East Pittsburgh, Pa., a corporation of Pennsylvania Application February 19, 1944, Serial No. 523,051

12 Claims. (Cl. 73—211)

This invention relates to fluid flow indicating devices and has for its principal object the provision of such device which is simple in construction and which accurately indicates the quantity being measured.

Another object of this invention is to provide a fluid flow indicating device which produces an electrical quantity indicative of the quantity being measured.

A further object of the invention is to provide a fluid flow indicating device of the character referred to which functions accurately irrespective of the fluctuations of the source of applied potential.

Yet another object of this invention is to provide a fluid flow indicating device of the character referred to which is, in so far as practical considerations are concerned, independent of temperature variations.

A still further object of this invention is to provide a fluid flow indicating device which is readily adjusted for zero indication under conditions of static fluid pressure.

Still another object of this invention is to provide a fluid flow indicating device in which erratic or unwanted mechanical movements are largely prevented.

Figure 1:
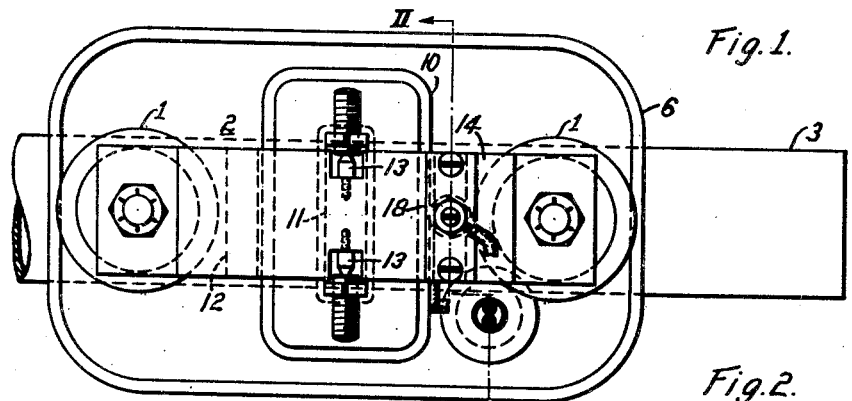
Figure 4:
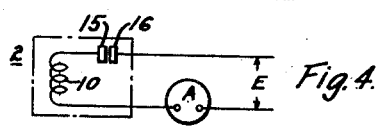
Figure 2:
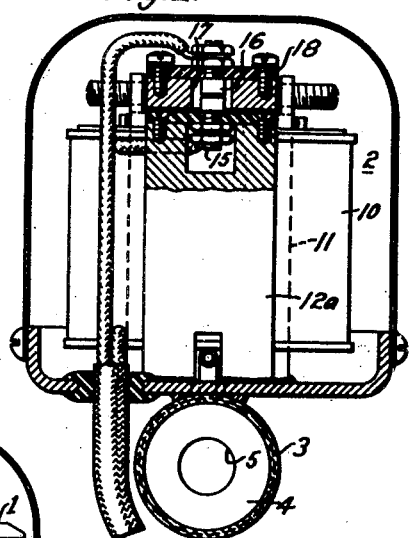
Figure 3:
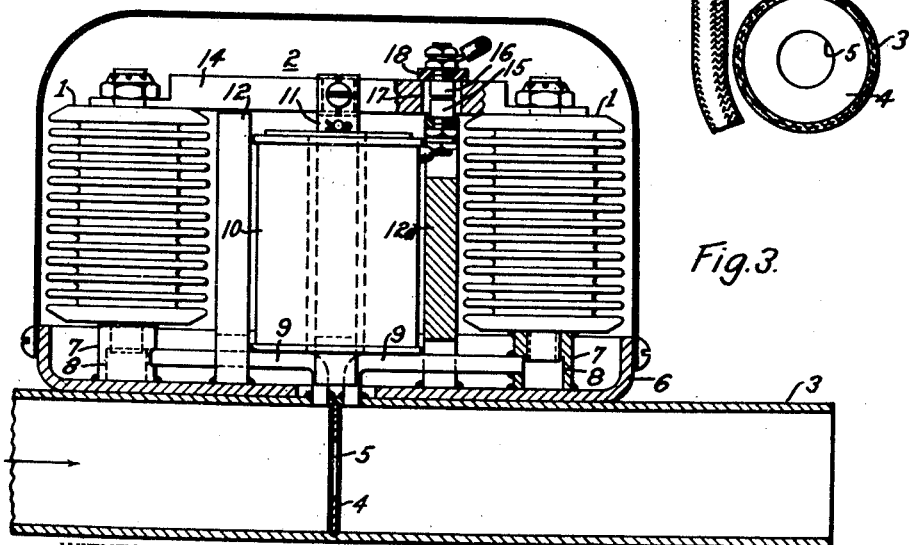

Other objects and advantages will become more apparent from a study of the following specification when considered in conjunction with the accompanying drawings, in which:

Figure 1 is a plan view, with the cover removed, of a device embodying the fundamental principles of this invention, Fig. 2 is a sectional view taken on the line II—II of Fig. 1, Fig. 3 is a sectional view longitudinally taken on Fig. 1, Fig. 4 is a schematic diagram of the electrical circuit of this invention, Fig. 5 is a plan view, with cover removed, of a preferred embodiment of this invention, Fig. 6 is a sectional view taken on the line VI—VI of Fig. 5, Fig. 7 is a detail of a modification of this invention, and Fig. 8 is a view looking upwardly from the bottom of Fig. 7.

Figure 9:
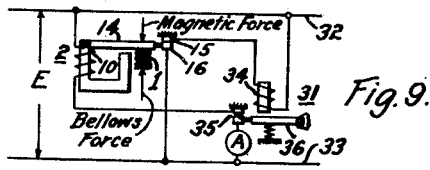

Fig. 9 is a schematic diagram illustrating a modified form of the circuit of Fig. 4.

The fundamental principle of this invention is to produce a mechanical quantity or force which is an indication of the rate of fluid flow through a pipe system and to oppose this force through the medium of electromagnetic means and to thereafter measure the electrical energy required to oppose the mechanical force.

Referring now to Figs. 1, 2 and 3, there is illustrated a device for indicating fluid pressure which functions according to the above stated principle. The mechanical force referred to is produced by the bellows 1 and this force is opposed by the electromagnetic device 2, the flow of current through the coil of the electromagnetic device 2 being an indication of the rate of flow of the liquid or fluid through the tubular conductor 3.

In detail, this embodiment of the invention comprises a tubular conductor 3 adapted to be connected in any pipe system in which the rate of fluid flow is desired to be known. A diaphragm 4 having a measuring orifice 5 therethrough is disposed in circumferential grooves within the tubular member 3. For the device shown, a flow of fluid is assumed to pass from left to right of the tubular conductor 3 through the orifice 5. Such movement of the fluid medium through the tubular conductor causes a pressure difference to occur on opposite sides of the diaphragm 4, a high-pressure area occurring on the left side of the diaphragm and a low-pressure area occurring on the right side, the difference in pressures being, as is well known in the art, an indication of the rate of flow of the fluid medium through the tubular conductor. A platform or base 6 of magnetic material is welded, brazed, or otherwise suitably secured to the tubular conductor 3 and has supported thereon, by means of the standards 7, the bellows 1 on opposite sides of the diaphragm 4. Suitable passages 8 are provided in the standards 7. Thus through the medium of the small tubes 9 the left-hand bellows 1 communicates with the high-pressure side of the tubular conductor and the right-hand bellows communicates with the low-pressure side of the tubular conductor. As a result of these connections, movements of the bellows indicate the pressure drop across the diaphragm 4. The electromagnetic unit 2 comprises a coil 10, a core structure including a center leg 11 and an outside leg 12. The armature 14 is carried in adjustable needle bearings 13 in the bifurcated extremity of the central core leg 11. This armature is preferably balanced about its pivot axis and has its extremities rigidly bolted to the top or free ends of the bellows 1. Hence when a pressure drop occurs across the diaphragm 4, a tilting moment is applied by the bellows to the armature 14 which is proportional to the rate of flow of the fluid medium through the tubular conductor. Contacting means comprising a stationary contact 15 and a moving contact 16, the stationary contact being supported upon an upstanding member 12a adjacent the right hand side of the coil 10 and supported on the base 6 and the moving contact being carried by the armature, are provided for the purpose of completing a circuit to the coil 10 of the electromagnetic unit. The member 12a is preferably of nonmagnetic material. As will be seen in Fig. 4, these contacts are connected in series circuit relation with the coil 10. Thus, as clockwise tilting of the armature occurs due to a pressure drop across the diaphragm 4, the coil circuit is completed and a magnetic flux is produced in the core structure which tends to rotate or tilt the armature in a counterclockwise direction, tending to open the contacts 15 and 16.

The specific manner in which the contacts 15 and 16 are supported will probably best be understood upon referring to Figs. 2 and 3. A hole 17 is provided in the armature 14 to provide clearance therethrough for the contacts. The contact 16 is provided with a threaded stud which engages an insulating cross member 18 fastened to the armature. The extension of the stud through this insulating member provides a terminal to which the wires of the electrical circuit may be connected. The contact 15, which is the stationary contact, is similarly supported across the bifurcated extremity of the nonmagnetic member 12a.

The operation of the device hereinbefore described may be considered as follows. Upon a flow of fluid through the tubular conductor 3, the armature is subjected to a tilting moment by the bellows 1 that is proportional to the pressure drop across the orifice. For such an orifice, the pressure drop is proportional to the square of the fluid velocity through the orifice. Immediately upon making of the contacts 15 and 16, the coil 10 of the electromagnet 2 is energized and a counter tilting moment opposing the pressure drop moment or bellows moment is applied to the movable armature. Thus energization of the electromagnet tends to move the armature so as to open the contacts. Actually, for a given pressure moment on the pivoted armature, a hovering condition of the contacts will be established which allows a magnet current to flow which will only be as large as is needed to produce a magnetic moment equal to the pressure moment on the armature. Thus it is evident that since the magnetic moment is proportional to the square of the coil current and the pressure moment is proportional to the square of the fluid velocity through the orifice, the coil current is then proportional to the fluid velocity. Thus these two square laws, matched in the hereinbefore described structure, produce a linear indication on an ammeter scale A, see Fig. 4, giving uniform accuracy over a wide fluid-flow range. The armature is preferably pivoted about its center of gravity to minimize the effect of vibration of the support and the bellows are so adjusted that their net torque on the armature is zero for the same pressure on each side of the orifice. This is necessary to make the flow indication independent of the average pressure in the duct system. In the device shown, the indication of fluid flow is independent of fluctuations in the source of electrical energy E.

The indication is also independent of temperature variations resulting in changes in coil temperature. This independence of supply voltage and coil temperature follows from the fact that the magnet force depends upon coil current only, and the coil current will automatically take on the right value to oppose a given bellows force. It will further be observed that the contact motion of a hovering contact, such as herein employed, is extremely small since no actual contact separation need occur but only variations in contact pressure which can occur with deflections measured in millionths of an inch. The ammeter A may be calibrated to read in gallons per hour, pounds per hour, or other suitable units.

Figs. 5 and 6 illustrate a preferred embodiment of the invention. In these two figures, parts similar to those of Figs. 1 to 3, inclusive, are given similar reference characters but these reference characters are primed. In this embodiment of the invention, the bellows 1' are horizontally disposed but their function is identical with that of the preceding description. The armature is provided with a vertical needle bearing pivot axis 13', one bearing of which is supported upon the base structure 6' and the other bearing of which is adjustable and is carried by the bar 20 which is supported upon the core structure 12' of the electromagnetic unit 2'. Contact 15' of the contacting means is supported upon the base 6' while the movable contact 16' is carried upon an extension 21 extending downwardly from the armature. Since in this embodiment of the invention the bellows are fastened to but one end of the armature, a mass 22 supported upon a threaded stud 19 extending from the opposite extremity of the armature is provided for the purpose of balancing the armature about its pivot axis. For the particular contact arrangement shown, the fluid flow is from right to left of the tubular conductor 3', as, for example, seen in Fig. 6. Thus a high-pressure area is formed on the right-hand side of the diaphragm 4' and a low-pressure area formed on the left-hand side of this diaphragm. Thus movement of the armature as viewed in Fig. 5 will be clockwise to move the moving contact 16' to the left to engage the stationary contact 15'. The function of the device illustrated in Figs. 5 and 6 as thus far described is identical with that of Figs. 1 to 3, inclusive. Hence, a further description is believed unnecessary.

In practice, it has been found that under some conditions the vibration of the magnet armature sometimes becomes erratic due to non-uniform rebound at the contacts. In such instances when the contact rebound is allowed to occur without hinderance, the cycle of armature vibration may not repeat itself consistently, as variations in the boundary conditions of motion will occur due to small changes in armature pivot friction or in contact balancing. As a result of such a condition, random fluctuations of the current measuring ammeter occur which renders difficult the determination of the correct average value of current corresponding to a given fluid flow. A simple and effective means has been found for restraining the magnet armature with friction forces automatically applied at the right instant in the vibratory cycle in order to damp erratic contact bouncing and to promote a smooth consistently repeated vibration of the contacts for any average current in the magnet coil.

As shown in Figs. 5 and 6, a pole piece 23 which is of flat U-shaped cross section bridges the air gap between the armature and the leg 12' of the core structure. This pole piece is supported in close proximity to the core and the armature across the air gap by means of a flat spring 24, which at one extremity is secured to the core structure and at the other extremity carries the pole piece 23. Thus the pole piece does not contact either the armature or the core until the electromagnetic unit is energized, at which time it is drawn against the core in the armature by the leakage flux at the air gap. There are many other methods of supporting this pole piece, one other method is illustrated in Figs. 7 and 8. Here the pole piece 23 is loosely carried by the pins 25, one of which extends through the pole piece into the armature and the other of which extends through the pole piece into the core structure. Clearance holes are provided in the pole piece for the pins 25 to provide a sufficiently loose mounting that the pole piece may not be bound during any of its movements.

The bridging pole piece 23 functions as a damper of armature movement in the following way. When the pressure force of the bellows forces the magnet coil contacts to close, the magnet is energized and the armature starts to pull away to open the contacts. At the instant that the main magnet is energized, the leakage flux from the armature air gap causes the bridging pole piece to be pulled against the side of the armature and also the core with a force proportional to the square of the coil current. Since one end of the bridging pole piece is against the movable armature while the other end is held against a portion of the stationary core structure, the motion of the armature is impeded then by a friction force equal to the normal force with which the pole piece is held by the magnetic forces against the core and the armature times the coefficient of friction between the armature and the pole piece. This retarding friction force comes into being upon the making of the armature contact and acts upon the armature during the small instant when the magnetic forces of the armature circuit are pulling the armature in a direction to open the coil contacts. Thus the armature is impeded by frictional forces during the small interval of time following the initial making of the contacts just when the armature tends to bounce back following the contact closure. This frictional restraint between the bridging pole piece and the contact carrying armature causes the incipient armature energy of rebound to be quickly dissipated and results in a high degree of uniformity in the repetition of the successive cycles of armature vibration. This damping frictional force does not affect the flow meter accuracy as might be the case if a frictional force were steadily applied to the armature as, for example, a spring constantly bearing against the armature. The damping frictional force exerted on the armature by the bridging pole piece does not affect the flow meter accuracy, because the damping force is reduced to zero at the same time that the main armature magnetic pull goes to zero and is at all times proportional to the main armature magnet pull. Proportionality of flow velocity to coil current is thus not impaired.

It is practically a manufacturing impossibility to obtain two bellows of the type employed for sensing the pressure differences in the tubular conductor which are identical, and which for the same fluid pressure will exert equal forces. As a result, it is ordinarily quite a problem to exactly balance the moments on the armature caused by the bellows when the pressures on each side of the diaphragm 4' are equal. While it is possible to balance these moments by shifting one bellows relative to the other radially along the armature to produce balanced opposed moments, this expedient is extremely difficult since, in many cases but the slightest movements are required to effect a moment balance. For this reason, an additional set of bellows 26 has been provided. These bellows are most conveniently placed in communication with the low-pressure side of the tubular conductor through the medium of the standard 27 supporting one end of the bellows 26, the tube 28 interconnecting the standard 27 and the standard 7' of the left-hand bellows I' and the tube 9' extending from the standard 7' into the tubular conductor adjacent the left-hand side of the diaphragm 4'. The other end of the bellows 26 is carried by means of a bracket 29 rigidly secured to the extremity of the armature which carries the mass and which extends parallel to the armature past the armature pivot. With this arrangement for a condition of equal pressures on the opposite sides of the diaphragm 4', the bellows 26 exert a force on the bracket 29 which is transmitted to the armature. Should a moment unbalance exist as a result of unequal forces being exerted by the main bellows I', the end of the bellows 26 secured to bracket 29 may be shifted to either side of the armature pivot in the slot 30 provided in the bracket, the bellows being sufficiently flexible along its length to permit the slight bending movement thereof required. Thus a balancing moment equal to the force applied to the bracket by the bellows 26 times its distance of displacement from the pivot axis is produced. Since the force exerted by the bellows 26 is considerably smaller than that exerted by either of the bellows I', and its force is applied in the region of the pivot axis, much larger displacements of the bellows 26 in the slot 30 are possible to produce moment balance than is possible by movement radially on the armature of either of the bellows I'. Thus it is possible to more easily produce a condition of moment equilibrium by the addition of the bellows 26 since its adjustments are less sensitive.

A modification of the circuit of Fig. 4 is illustrated in Fig. 9. In this circuit the coil 10 is energized through the medium of a relay 31 which is energized by making of the movable contact 16 with the stationary contact 15. The purpose of adding the relay 31 is to permit operation of the contacts 15 and 16 in a circuit in which the currents are small, that is, smaller than in the circuit of the electromagnet coil 10, to prevent, should such a condition exist, burning of the armature operated contacts 15 and 16. Thus arcing of the contacts 15 and 16 is kept at a minimum and hence their control of currents in the system remain accurate for a longer period of time.

Specifically the circuit comprises a pair of supply conductors 32 and 33 energized by a suitable source of electrical energy indicated at E. The relay 31 has its coil 34 connected in series with the armature contacts 15 and 16 across the supply conductors 32 and 33. The coil 10 of the electromagnetic device 2 is connected in series with the normally open contacts 35 of the relay 31 and these series connected elements are connected across the supply conductors 32 and 33. Thus upon closure of the contacts 15 and 16 due to an unbalance of fluid pressure moments the armature 36 of the relay 31 is picked up closing the contacts 35 operated thereby to energize the coil 10 of the electromagnetic device 2 to tend momentarily to interrupt the circuit to the relay 31, hence, a momentary interruption of current to the main electromagnet coil 10 is effected by the relay 31. Thus it may be seen that in a manner analogous to the operation of circuit of Fig. 4 the current flow indicated by the ammeter A in the circuit of the coil 10 is an indication of the rate of fluid flow through the tubular conductor. It is quite likely that a more positive making and breaking action may occur at the contacts 35 than occurs at the contacts 15 and 16 because of the mechanical characteristics of the relay 31. This making and breaking action of the contacts however, occurs at a fairly high frequency, sufficiently high to produce a pulsating or intermittent current flow in the system which produces an average current indication on the ammeter scale. This ammeter indication as before may be in terms of gallons per hour, pounds per hour or other suitable units.

The foregoing disclosure and the showings made in the drawings are merely illustrative of the principles of this invention and are not to be construed in a limiting sense. The only limitations are to be determined by the scope of the appended claims.

I claim as my invention:

1. In a device for indicating a flow of fluid in a fluid conducting system, the combination of, a tubular member for connection in such system, a diaphragm having a measuring orifice therethrough disposed within said tubular member, a pair of bellows one disposed on each side of said diaphragm in communication with the tubular member, an electromagnetic device including a coil, a core and a movable armature, said armature being connected to said bellows and operated by the differential movements thereof and having a portion thereof disposed in magnetically operable relationship with said core, a stationary contact, a movable contact, said movable contact being operated by said armature, differential movement of said bellows moving said armature to close said contacts and energization of the coil of said electromagnetic device moving said armature in a direction to open said contacts, an electrical circuit interconnecting said contacts and said coil, pressure responsive means communicating with said tubular member and connected with said armature for balancing the forces acting on said armature due to said pair of bellows when the flow rate of said fluid is zero, and means for indicating a flow of current in the electrical circuit.

2. Apparatus responsive to a flow of fluid comprising, in combination, a tubular conductor having a measuring orifice therein through which the fluid passes, a pair of bellows in communication with the tubular conductor on opposite sides of the measuring orifice, and mechanically interconnected in opposed relationship, and an additional bellows in communication with the tubular conductor on one side of the measuring orifice and adjustably connected to said pair of bellows to balance movements of the pair of bellows when fluid pressure on opposite sides of the measuring orifice are equal.

3. Apparatus responsive to a flow of fluid comprising in combination, a tubular conductor having a measuring orifice therein through which the fluid passes, a pair of bellows in communication with the tubular conductor on opposite sides of the measuring orifice, a pivot, an element pivotally mounted on said pivot and at a distance therefrom mechanically interconnecting the pair of bellows in opposition, an additional bellows in communication with the tubular conductor on one side of the measuring orifice, and means for mechanically connecting the additional bellows along a portion of said element extending on opposite sides of said pivot.

4. Apparatus for indicating a flow of fluid comprising, in combination, a tubular conductor having a measuring orifice therein through which the fluid passes, a pair of bellows in communication with the tubular conductor on opposite sides of the measuring orifice, a pivot, an element of magnetic material pivotally mounted on said pivot and at a distance therefrom mechanically interconnecting the pair of bellows in opposition, an additional bellows in communication with the tubular conductor on one side of the measuring orifice, means for mechanically connecting the additional bellows along a portion of said element extending on opposite sides of said pivot, contacting means operated to closed position by movement of said element by said first recited bellows, an electromagnetic unit magnetically coupled to said element for operating said element to open the contacting means, an electrical circuit connecting said contacting means and said electromagnetic unit upon closure of the contacting means, and means for indicating a flow of current in the electrical circuit.

5. Apparatus for indicating a flow of fluid comprising, in combination, a tubular conductor having a measuring orifice therein through which the fluid passes, a pair of bellows in communication with the tubular conductor on opposite sides of the measuring orifice, a pivot, an element of magnetic material pivotally mounted on said pivot and at a distance from said pivot along the element mechanically connecting the bellows in opposed relationship, an additional bellows in communication with the tubular conductor on one side of the measuring orifice, means for mechanically connecting the additional bellows along a portion of said element extending on opposite sides of said pivot, contacting means operated to closed position by movement of said element by said bellows, an electromagnetic unit magnetically coupled to said element for operating said element to open the contacting means, an electrical circuit connecting said contacting means and said electromagnetic unit upon closure of the contacting means, means responsive to magnetic effects of the electromagnetic unit for frictionally engaging said element, and means for indicating a flow of current in the electrical circuit.

6. Apparatus responsive to a physical quantity comprising, in combination, a core structure of magnetic material, a movable armature of magnetic material disposed in proximity to said core structure, coil means disposed on said core structure, contacting means including a stationary and a movable contact, said movable contact being carried by said movable armature and being disposed to disengage said stationary contact by movement of said armature towards said core structure and to engage said stationary contact by movement of said armature away from said core structure, means responsive to said physical quantity for biasing said movable armature away from said core structure, a source of electric current, and circuit means connecting said coil means and said contacting means in series circuit relation with said source of electric current.

7. Apparatus responsive to a physical quantity comprising, in combination, a core structure of magnetic material, a movable armature of magnetic material disposed in proximity to said core structure, coil means disposed on said core structure, contacting means including a stationary and a movable contact, said movable contact being carried by said movable armature and being disposed to disengage said stationary contact by movement of said armature towards said core structure and to engage said stationary contact by movement of said armature away from said core structure, means responsive to said physical quantity for biasing said movable armature away from said core structure, a relay having a coil and a set of contacts, a source of electric current, circuit means connecting the coil of said relay in series with said contacting means and said source of electric current, and circuit means connecting said set of contacts of said relay in series with said coil means and said source of electric current.

8. Apparatus responsive to a physical quantity comprising, in combination, a core structure of magnetic material, a movable armature of magnetic material disposed in proximity to said core structure so that at least one air gap is formed therebetween, coil means disposed on said core structure, circuit means including contacts responsive to movement of said armature, said contacts being opened upon movement of said armature towards said core structure and being closed upon movement of said armature away from said core structure, means responsive to said physical quantity for biasing said movable armature away from said core structure, an element of magnetic material, means movably supporting said element to bridge said air gap in proximity to said core structure and movable armature, said element being magnetically attracted to engage said core structure and said movable armature upon energization of said coil means, and circuit means connecting said coil means in series circuit relation with said contacts.

9. In a device responsive to a physical quantity, the combination of, a U-shaped core structure of magnetizable material, a coil disposed on said core structure to produce a magnetic flux therein when energized, an armature member of magnetizable material straddling the extremities of said core structure, means pivotally supporting said armature member adjacent one extremity of said core structure, affording pivotal movement of said armature member away from and toward the remaining extremity of the core structure, a stationary contact, a movable contact responsive to movement of said armature member, said movable contact engaging said stationary contact upon pivotal movement of said armature member away from said core structure and disengaging said stationary contact upon pivotal movement of said armature member toward said core structure, means responsive to said physical quantity for pivotally biasing said armature member away from said core structure, a source of electric current, and circuit means connecting said coil and said stationary and movable contacts in series circuit relation with said source of electric current.

10. In a fluid flow indicating device, the combination of a tubular member for conducting a flow of fluid, a diaphragm within the tubular member having an orifice through which the fluid passes, a U-shaped core structure of magnetizable material, a coil disposed on said core structure to produce a magnetic flux therein when energized, an armature member of magnetizable material straddling the extremities of said core structure, means pivotally supporting said armature member adjacent one extremity of said core structure, affording pivotal movement of said armature member away from and toward the remaining extremity of said core structure, a stationary contact, a movable contact responsive to movement of said armature member, said movable contact engaging said stationary contact upon pivotal movement of said armature member away from said core structure and disengaging said stationary contact upon pivotal movement of said armature member toward said core structure, means responsive to the fluid pressure differential across said diaphragm for biasing said armature member away from said core structure, a source of electric current, circuit means connecting said coil, and stationary contact and said movable contact in series circuit relation with said source of electric current, and means for indicating a flow of current in said circuit means.

11. In a device responsive to a flow of fluid through a tubular member having a measuring orifice therein through which the fluid passes, the combination of, a set of contacts, means responsive to the fluid pressure on opposite sides of the measuring orifice for closing said contacts, electromagnetic means having a coil, a core and a movable armature, for opening said contacts upon energization of said coil and movement of said armature toward said core, circuit means connecting said contacts in series circuit relation with said coil for energizing said coil upon closure of said contacts, a member of magnetizable material, and means movably supporting said member in the region of the magnetic field adjacent said core and said armature for engagement with both of said core and said armature in dependence of said magnetic field.

12. Apparatus responsive to a physical quantity comprising, in combination, a core structure of magnetic material, a movable armature member of magnetic material disposed in proximity to said core structure, coil means disposed on said core structure, contact means actuated by said armature member, said contact means being closed by movement of said armature member away from said core structure and being opened by movement of said armature member towards said core structure, means responsive to said physical quantity for moving said armature member away from said core structure, a source of electric current, and circuit means connecting said coil means, said contact means and said source of electric current in series circuit relation.

STANLEY J. MIKINA.

REFERENCES CITED

The following references are of record in the file of this patent:

UNITED STATES PATENTS

| Number | Name | Date |
|---|---|---|
| 1,296,947 | Blot-Garnier | Mar. 11, 1919 |
| 1,578,411 | Erickson | Mar. 30, 1926 |
| 1,638,101 | Roucka | Aug. 9, 1927 |
| 1,855,205 | Schur | Apr. 26, 1932 |
| 2,098,574 | Doyle | Nov. 9, 1937 |
| 2,134,951 | Piesker et al. | Nov. 1, 1938 |
| 2,151,941 | Rydberg | Mar. 28, 1939 |
| 2,312,485 | Richmond | Mar. 2, 1943 |
| 2,319,363 | Wunsch et al. | May 18, 1943 |
| 2,365,573 | McGay | Dec. 19, 1944 |

FOREIGN PATENTS

| Number | Country | Date |
|---|---|---|
| 59,355 | Germany | Oct. 17, 1891 |